US012631434B2

(12) United States Patent
Beitia Gómez De Segura et al.

(10) Patent No.: US 12,631,434 B2
(45) Date of Patent: May 19, 2026

(54) PROCEDURE AND INSTALLATION FOR LOADING BOREHOLES WITH BULK WATER-BASED SUSPENSION OR WATERGEL TYPE EXPLOSIVES

(71) Applicant: MAXAMCORP HOLDING, S.L., Madrid (ES)

(72) Inventors: Fernando María Beitia Gómez De Segura, Madrid (ES); José Ramón Quintana Angulo, Bizkaia (ES); Arturo Carranza Vítores, Bizkaia (ES); Miguel Rafael Laguillo Sabás, Madrid (ES); Eneko Izaguirre Mingo, Burgos (ES)

(73) Assignee: MAXAMCORP INTERNATIONAL, S.L., Madrid (ES)

( * ) Notice: Subject to any disclaimer, the term of this patent is extended or adjusted under 35 U.S.C. 154(b) by 1169 days.

(21) Appl. No.: 17/047,717

(22) PCT Filed: Apr. 15, 2019

(86) PCT No.: PCT/EP2019/059654
§ 371 (c)(1),
(2) Date: Oct. 15, 2020

(87) PCT Pub. No.: WO2019/201851
PCT Pub. Date: Oct. 24, 2019

(65) Prior Publication Data

US 2021/0164765 A1 Jun. 3, 2021

(30) Foreign Application Priority Data

Apr. 16, 2018 (EP) .................................... 18382253

(51) Int. Cl.
*F42D 1/10* (2006.01)
*B01F 23/232* (2022.01)
(Continued)

(52) U.S. Cl.
CPC .............. *F42D 1/10* (2013.01); *B01F 23/232* (2022.01); *B01F 33/401* (2022.01); *B01F 33/409* (2022.01); *B01F 2101/34* (2022.01)

(58) Field of Classification Search
None
See application file for complete search history.

(56) References Cited

U.S. PATENT DOCUMENTS 3,288,658 A 11/1966 Ferguson et al.
3,303,738 A 2/1967 Clay et al.
(Continued)

FOREIGN PATENT DOCUMENTS

CN 103553850 A 2/2014
EP 0203230 A1 12/1986
(Continued)

OTHER PUBLICATIONS

International Search Report in related case PCT/EP2019/059654 dated Dec. 7, 2019.
(Continued)

*Primary Examiner* — Aileen B Felton
(74) *Attorney, Agent, or Firm* — Casimir Jones, S.C.; Tristan A. Fuierer

(57) ABSTRACT

The present invention relates to a method and installation for loading boreholes with bulk water-based suspension or watergel type explosives characterized by the sensitization of the product by mixing a non-explosive or low sensitivity suspension matrix with compressed gas (e.g. air) at the end of the delivery hose.

7 Claims, 2 Drawing Sheets

(51) Int. Cl.
*B01F 33/40* (2022.01)
*B01F 101/34* (2022.01)

(56) References Cited

U.S. PATENT DOCUMENTS

| | | | |
|---|---|---|---|
| 3,380,033 | A | 4/1968 | Černý |
| 3,400,026 | A | 9/1968 | Fearnow |
| 3,582,411 | A | 6/1971 | Brockbank et al. |
| 3,610,088 | A | 10/1971 | Christensen et al. |
| 3,678,140 | A | 7/1972 | Adams et al. |
| 3,706,607 | A | 12/1972 | Chrisp |
| 3,711,345 | A | 1/1973 | Tomic |
| 3,713,919 | A | 1/1973 | Tomic |
| 3,770,522 | A | 11/1973 | Tomic |
| 3,790,415 | A | 2/1974 | Tomic |
| 3,886,010 | A | 5/1975 | Thornley et al. |
| 4,676,849 | A | 6/1987 | Curtin et al. |
| 4,931,110 | A | 6/1990 | Mckenzie et al. |
| 4,959,108 | A | 9/1990 | Waldock |
| 4,966,077 | A * | 10/1990 | Halliday .................. F42D 1/10 86/20.15 |
| 5,322,576 | A | 6/1994 | Aitken et al. |
| 5,928,576 | A | 7/1999 | Zimmermann |
| 6,070,511 | A | 6/2000 | Palmer et al. |
| 6,397,719 | B1 | 6/2002 | Vestre |
| 6,397,754 | B1 | 6/2002 | Perlid |
| 6,537,399 | B2 | 3/2003 | Gomez De Segura et al. |
| 6,610,158 | B2 | 8/2003 | Lanza Rivas et al. |
| 6,949,153 | B2 | 9/2005 | Gomez de Segura et al. |
| 8,820,242 | B2 | 9/2014 | Alexander |
| 9,207,055 | B2 | 12/2015 | Halander |
| 9,327,257 | B2 | 5/2016 | Pratas Da Silva et al. |
| 9,846,020 | B2 | 12/2017 | Mykkänen |
| 10,532,959 | B2 | 1/2020 | Quintana Angulo et al. |
| 2002/0124918 | A1 * | 9/2002 | Beitia Gomez De Segura ........... C06B 47/00 149/109.6 |
| 2007/0277916 | A1 | 12/2007 | Halander et al. |
| 2016/0146587 | A1 | 5/2016 | Zank et al. |
| 2017/0254629 | A1 | 9/2017 | Tang |
| 2018/0029950 | A1 | 2/2018 | Quintana Angulo et al. |

FOREIGN PATENT DOCUMENTS

| | | | |
|---|---|---|---|
| EP | 1002777 | B1 | 1/2003 |
| EP | 1207145 | B1 | 5/2005 |
| EP | 3231786 | A1 | 10/2017 |
| GB | 1362352 | A | 8/1974 |
| WO | 9914554 | A1 | 3/1999 |
| WO | WO2014123562 | A1 | 8/2014 |
| WO | 2014154824 | A1 | 10/2014 |
| WO | WO2015140462 | A1 | 9/2015 |

OTHER PUBLICATIONS

Bhandari S., "Engineering Rock Blasting Operations", A.A. Balkema Publishers, Rotterdam, Brookfield, 1997, 12 Pages.

* cited by examiner

PROCEDURE AND INSTALLATION FOR LOADING BOREHOLES WITH BULK WATER-BASED SUSPENSION OR WATERGEL TYPE EXPLOSIVES

CROSS-REFERENCE TO RELATED APPLICATIONS

This application is filed under the provisions of 35 U.S.C. § 371 and claims the priority of International Patent Application No. PCT/EP2019/059654 filed on 15 Apr. 2019 entitled "PROCEDURE AND INSTALLATION FOR LOADING BOREHOLES WITH BULK WATER-BASED SUSPENSION OR WATERGEL TYPE EXPLOSIVES" in the name of Fernando María BEITIA GÓMEZ DE SEGURA, et al., which claims priority to European Patent Application No. 18382253.5, filed on 16 Apr. 2018, both of which are hereby incorporated by reference herein in their entirety.

FIELD OF THE INVENTION

The present invention relates to the field of civil explosives for use in mining and public works. More specifically, it relates to a method and installation for loading boreholes with bulk water-based suspension or watergel type explosives with "on-site" sensitization.

BACKGROUND OF THE INVENTION

The continuous growing of the demand of minerals and metals during the last decades has provoked a huge increase in the consumption of explosives. To supply the demand of explosives the market has evolved from package to bulk explosives that are transported, sensitized and delivered into the boreholes at the mines by installations assembled on mobile units or trucks. The manufacture of bulk explosives began in the 50s with the introduction of ANFO, followed in the 60s-70s with slurries, watergels and emulsions and today more than 90% of all explosives consumed are delivered in bulk form.

Bulk explosives are characterized basically for being blends of oxidizers and fuels. The sensitivity of this type of explosives is owing to the introduction of bubbles of gas within the blend of oxidizer and fuel that when exposed to a shock wave generate hot spots.

The introduction of gas bubbles can be made by trapping the gas during the mixture or by its formation by a chemical reaction. In the U.S. Pat. No. 3,400,026 a formulation which uses protein in solution (albumin, collagen, soy protein, etc.) to favor the formation of bubbles and their stabilization is described. The U.S. Pat. No. 3,582,411 describes a watergel explosive formulation which contains a foaming agent of the guar gum type modified by hydroxy groups.

In the U.S. Pat. No. 3,678,140 a process for the incorporation of air by means of the use of protein solution is described, passing the composition through a series of openings at pressures from 40 to 160 psi to create a vacuum in the area where the blasting agent exits from the orifice, incorporating air.

The incorporation of gas bubbles by generation by means of a chemical reaction is described in the U.S. Pat. Nos. 3,706,607, 3,711,345, 3,713,919, 3,770,522, 3,790,415 and 3,886,010.

"On-site" ("In situ") manufacturing and sensitization of the explosive became common since it allows a safer transport to the site of use.

The earliest patents relating to "on-site" explosive manufacture, i.e., the manufacture of the explosive by mixing all its components in the same truck used for unloading the explosive into the blast holes, were filed by IRECO (U.S. Pat. Nos. 3,303,738 and 3,380,033). These patents describe the manufacture of a water-gel-type explosive in a truck by means of metering and mixing a liquid solution containing oxidizing salts with a solid material containing oxidizing salts and thickeners. U.S. Pat. No. 3,610,088 (IRECO) describes the same method as the preceding patents for the "on-site" manufacture of a water-gel, incorporating the simultaneous addition of air either by means of mechanical trapping or by means of generating a gas through a chemical reaction. Patent EP0203230 (IRECO) describes a blender having mobile and fixed blades allowing the 'on-site' manufacture of a water-in-oil emulsion-type blasting agent.

The greatest drawback of these earliest "on-site" manufacturing technologies lies in the fact that they use high temperature oxidizing salt solutions that must be transported with a heat supply in thermally insulated tanks. The complexity of the truck and of the manufacturing operation requires highly qualified staff to assure its success.

The need for safer and simpler solutions changed the trend towards the transport of more finished products (matrix or base product) but still classified as non-explosive and their "on-site" sensitization. In this context, MAXAM (formerly known as Unión Española de Explosivos) developed a series of technologies to manufacture matrix suspensions and the transport of a non-explosive matrix suspension and its 'on-site' sensitization by means of incorporating air to the matrix (mechanical gassing) before unloading it into the blast hole.

European patent EP1002777 B1 (MAXAM, formerly known as Unión Española de Explosivos) describes a method and an installation for the 'on-site' sensitization of water-based explosives before loading the blast holes from a non-explosive matrix suspension. The sensitization is carried out by means of mixing metered amounts of the matrix product with a gas or air and a gas bubble stabilizer before delivery into the bore holes. A drawback of this method is that the product is sensitized, i.e. becomes explosive, before being pumped to the bore hole. Likewise, European patent EP1207145 B1 (MAXAM, formerly known as Unión Española de Explosivos) discloses a method for the "on-site" manufacture of water-based explosives before loading the blast holes from an oxidizing matrix suspension with an oxygen balance greater than +14%, a fuel material, a gas or air and a gas bubble stabilizer. United States patent U.S. Pat. No. 6,949,153 B2 (MAXAM, formerly known as Unión Española de Explosivos) describes a method for the "on-site" manufacture of pumpable explosive mixtures by means of mixing a granular oxidizer with a non-explosive matrix suspension stabilized with a thickener, air and a gas bubble stabilizer which allows regulating the density of the product according to the process conditions. This method allows controlling the density of the explosive product before loading into the blast holes by means of the controlled incorporation of atmospheric air by mechanical means.

More recently, International PCT application WO2014/154824 A1 (MAXAM)describes a method for "on site" manufacture of water resistant low density watergel explosives from a non-explosive matrix containing a crosslinkable polymer and a gas bubble generating agent (chemical gassing).

Chemical gassing requires waiting until some chemical reactions take place to reduce the density of the product since it is pumped into the borehole. That makes difficult to have a good control of the height of explosive in the borehole what can provoke poorer performance owing to underloading, or environmental impacts (as vibrations, air shock wave, spillage) owing to overloading.

The main advantage of the mechanical gassing methods described before is that they allow checking the final density of the product before pumping into the borehole. However, there are some drawbacks related with pumping the product already sensitized at the final density:

- the product is already an explosive.
- spillage of product when moving the hose from hole to hole. The bubbles of gas inside the product compress when pumping. Once the pump stops the pressure is relaxed and the product comes out being difficult to prevent spillage when moving the hose from hole to hole.
- poorer control of the amount of product pumped because of changes of density of the sensitized product with pressure.
- higher complexity of the installation since it is needed additional equipment to load the boreholes.
- higher difficulty to change density along the column of the explosive.

A need thus exists to find new techniques for loading boreholes with bulk water-based suspension or watergel type explosives with "on-site" sensitization.

BRIEF DESCRIPTION OF THE INVENTION

The solution provided in the present invention reduces or eliminates all the drawbacks of the mechanical gassing methods exposed in the background section, keeping the advantages of mechanical gassing compared to chemical gassing. In particular, the present invention refers to a method and installation for loading boreholes with bulk water-based suspension or watergel type explosives characterized by the sensitization of the product by mixing a non-explosive or low sensitivity suspension matrix with compressed gas (e.g. air) at the end of the delivery hose.

In an aspect, the present invention is directed to a procedure for loading a borehole with a bulk water-based suspension or watergel type explosive comprising: (i) transportation of a non-explosive or low sensitivity water-based matrix suspension to the location for loading, said suspension comprising at least an oxidant salt, a fuel and a thickener, and (ii) sensitization of the explosive during the delivery into the borehole characterized in that said procedure comprises:

a) dosing the suspension into the borehole through a delivery hose,
b) injecting gas at the end part of the delivery hose,
c) dispersing the gas into the suspension by means of a mixer located at the end of the hose, and
d) fixing the explosive density by the regulation of the flow rates of matrix and gas.

In another aspect, the present invention is directed to an installation for loading a bulk water-based suspension or watergel type explosive into a borehole according to the above procedure characterized by having:

a) a tank (1) for the storage of the matrix suspension,
b) a delivery pump (2) connected to the matrix tank (1),
c) a delivery hose (3) connected to the pressure side of the delivery pump (2),
d) an "in-line" mixer (4) located at the end of the delivery hose (3),
e) a compressed gas reserve (5),
f) a gas flow regulator (6) connected to the compressed gas reserve (5), and
g) a conduit (7) connecting the flow regulator (6) with the mixer (4).

DETAILED DESCRIPTION OF THE INVENTION

Figure 1:
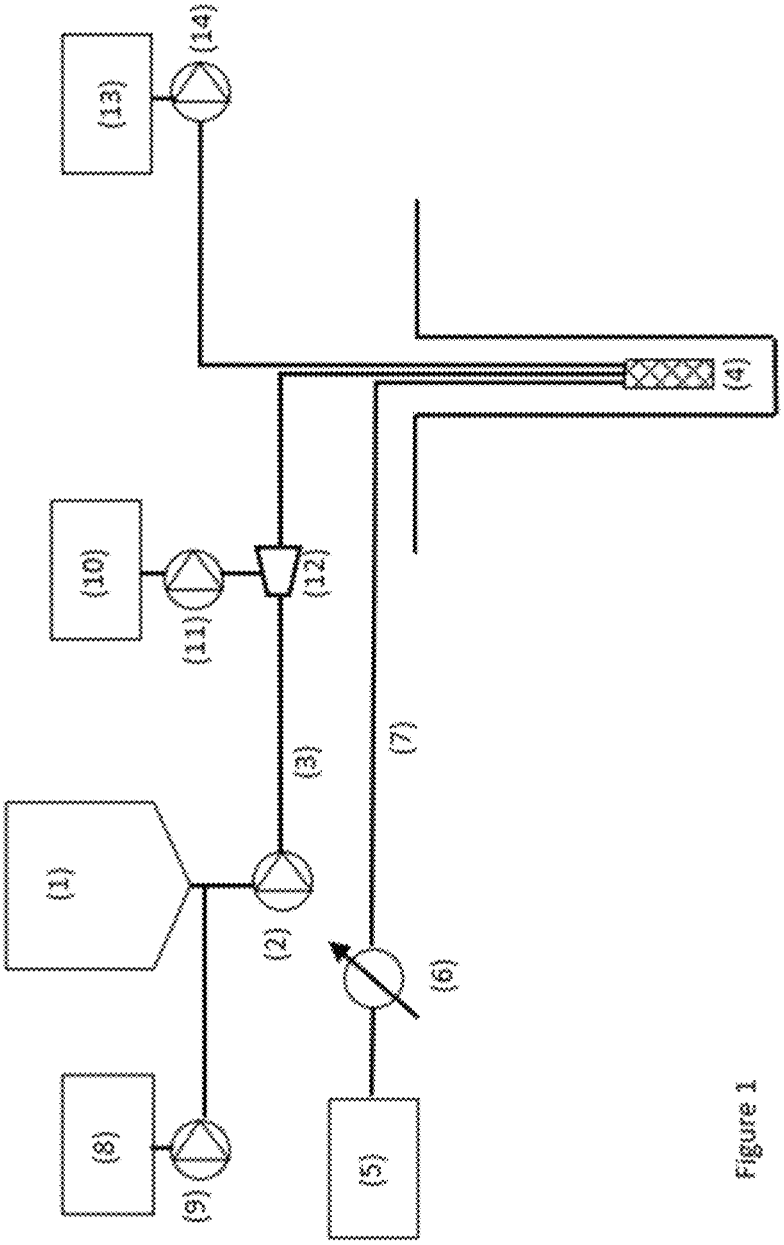
FIG. 1 shows a schematic drawing of an embodiment of an installation for loading boreholes with bulk watergel explosives according to this invention.

The object of the invention is a method and an installation for loading boreholes with bulk water-based explosives (suspensions or watergel type) as defined above.

Optionally a gas bubble stabilizer and/or a crosslinker can be mixed with the matrix before the mixer at the end of the hose.

The method can be performed in an installation on a mobile vehicle for loading explosives into blast holes having compartments for the different components.

The non-explosive or low sensitivity matrix suspension (i.e. the matrix or base product) is formed by a water based liquid mixture that comprises at least an oxidant salt, a fuel (which may be present in solution, in emulsion or in suspension) and a thickener. Preferably, the non-explosive or low sensitivity matrix suspension according to the present invention complies with the United Nations standards for recognition as UN3375, class 5.1 oxidiser (i.e. non-explosive).

As oxidant salts, nitrates, chlorates and perchlorates of ammonium, alkaline and alkaline-earth metals may be conveniently used as well as mixtures thereof. Precisely, these salts can be among others, the nitrates, chlorates, and perchlorates of ammonium, sodium, potassium, lithium, magnesium, calcium, or mixtures thereof. In general, the total concentration of oxidant salts present in the base product may vary between 30% and 90% by weight of the base product, preferably between 40 and 75% and more preferably between 60 and 75%.

In a preferred embodiment, the oxidant salt is or comprises ammonium nitrate.

Organic compounds belonging to the group formed by aromatic hydrocarbons, saturated or unsaturated aliphatic hydrocarbons, amine nitrates, oils, petrol derivatives, vegetable occurring derivatives such as starches, flours, sawdust, molasses and sugars, or metallic fuels finely divided such as aluminum or ferro-silica may be conveniently used as fuels. In general, the total fuel concentration in the base product may vary between 1% and 40% by weight of the base product, preferably between 3% and 20% and more preferably between 10 and 20%.

According to particular embodiment, amine nitrate and/or diesel oil, a petroleum based fuel consisting of both saturated and aromatic hydrocarbons, is used as fuel. The amine nitrate fuels are useful to increase the solubility and sensibility of the product and are preferably selected from alkylamine nitrates, alkanolamine nitrates, and mixtures thereof, such as methylamine nitrate, ethanolamine nitrate, diethanolamine nitrate, triethanolamine nitrate, dimethylamine nitrate, as well as the nitrates from other hydrosoluble amines such as hexamine, diethylenetriamine, ethylenediamine, laurylamine and mixtures thereof.

In a preferred embodiment, the fuel is one or more amine nitrates. In a more preferred embodiment, the fuel is or comprises hexamine nitrate.

In another preferred embodiment, the fuel comprises one or more amine nitrates and an additional fuel. In a more particular embodiment, the fuel comprises methyl amine nitrate and diesel fuel.

As thickening agents, products derived from seeds such as guar gum, galactomanans, biosynthetic products such as xanthan gum, starch, cellulose and their derivatives such as carboxymethylcellulose or synthetic polymers such as polyacrylamide, may be conveniently used. In general, the concentration of thickening agents in the base product may vary between 0.1% and 5% by weight of the base product, preferably between 0.5% and 2%.

In a preferred embodiment, the thickening agent is or comprises guar gum.

In a preferred embodiment, the matrix product is a water based suspension comprising or consisting of methyl amine nitrate, ammonium nitrate, guar gum and diesel fuel. In another preferred embodiment, the matrix product is a water based suspension comprising or consisting of hexamine nitrate, ammonium nitrate and guar gum.

In an embodiment of the invention the gas is compressed air, but it could be nitrogen, oxygen, carbon dioxide, or whatever compressed gas that once dispersed, the bubbles of gas will act as hot spot when compressed by a shock wave. The volumetric ratio between the gas and the matrix suspension may normally vary between 0.05 and 5, preferably between 0.1 and 1.

The mixing of the matrix suspension and the gas is done in an "inline" mixer located at the end of the hose. The gas is sent to the inlet of mixer through a tube that goes either inside or outside of the hose. In a preferred embodiment, the inline mixer is a static mixer, more preferably a helicoidal static mixer. The matrix suspension flow rate is regulated controlling the rpms of the pump and the gas flow rate is regulated by a flow regulator. In a preferred embodiment, this regulator is a constant flow regulator i.e. a mechanism that allows controlling the impact of pressure changes such that the flow is always constant and is the desired one. Of course, this does not mean that the gas flow is kept constant during the whole process but that the actual gas flow is the desired one at any point in the process.

Additionally, one or more stabilizing agents of gas bubbles can be added, among which there are for instance surface-active agent solutions or dispersions of the type derived from amines of fatty acids such as for example laurylamine acetate or proteins of the type egg albumin, lactalbumin, collagen, soy protein, guar protein or modified guar gum of the guar hydroxypropyl type. In general, the stabilizing agent may be added to the base product in a concentration comprised between 0.01% and 5% by weight with respect to the weight of the base product, preferably between 0.1% and 2%.

Additionally, it is preferred to add a crosslinker to improve the water resistance. Among the crosslinking agents the antimmonium compounds such as potassium pyroantimonate, antimmonium and potassium tartrate, chromium compounds such as chromic acid, sodium or potassium dichromat, zirconium compounds such as zirconium sulphate or zirconium diisopropylamine lactate, titanium compounds such as titanium triethanolamine chelate or aluminum compounds such as aluminum sulphate, can be conveniently used. In general, the concentration of the crosslinking agent may vary between 0.01% and 5% by weight with respect to the weight of the base product, preferably between 0.01% and 2%.

Optionally, the matrix suspension can be blended with ANFO or any oxidizer in granular form and optionally a fuel, being the percentage of matrix higher than 50%, so that the blend could be pumped.

The method for loading blast holes provided by this invention has the advantages of mechanical gassing methods compared with chemical gassing (i.e. control of final density without waiting for gassing, good control of explosive column height, etc.) and overcomes some of the drawbacks as pumping an already sensitized explosive, and spillage between holes because of relaxation of the pressure in the hose. Mixing the gas at the end of the hose allows changing the density at any length in the column of explosive immediately without waiting until the chemical reaction takes place.

As opposite to emulsions, suspensions have the capability to entrap high volumes of gas what allows to get very low densities. On crosslinking the suspension becomes a solid watergel keeping the bubbles inside the rubberlike gel, preventing coalescence of the bubbles.

The method for loading blast holes provided by this invention allows charging all types of bore holes, either open pit or underground. This method allows pumping in 360° in all type of operations, production, development, up holes, etc.

This method is specially competitive in development works in tunnels reducing the total cycle time since it allows to shoot the blast just after loading without waiting until the product get gassed. It also allows reducing the density to very low values being possible to load with the same base product the cut area with high density to get full advance and the contour with very low density, reducing the damage of the walls.

The invention also relates to an installation for loading boreholes with a bulk water-based suspension or watergel type explosive according to the previously described procedure. In FIG. 1 is shown an embodiment which comprises:

- a tank (1) for the storage of the matrix suspension;
- a delivery pump (2) connected to the matrix tank (1);
- a delivery hose (3) connected at the outlet of the delivery pump (2);
- an inline mixer (4) located at the end of the delivery hose (3);
- a compressed gas reserve (5);
- a gas flow regulator (6) with flowmeter;
- a conduit (7) connecting the flow regulator (6) with the mixer (4) to convey the gas from the flow regulator (6) to the mixer (4) and the following optional components:

- a tank for a gas stabilizer (8) with a stabilizer pump (9),
- a tank for water (10) with a water pump (11) and a water lubrication ring (12), and
- a tank for a crosslinker (13) with a crosslinker pump (14).

Figure 2:
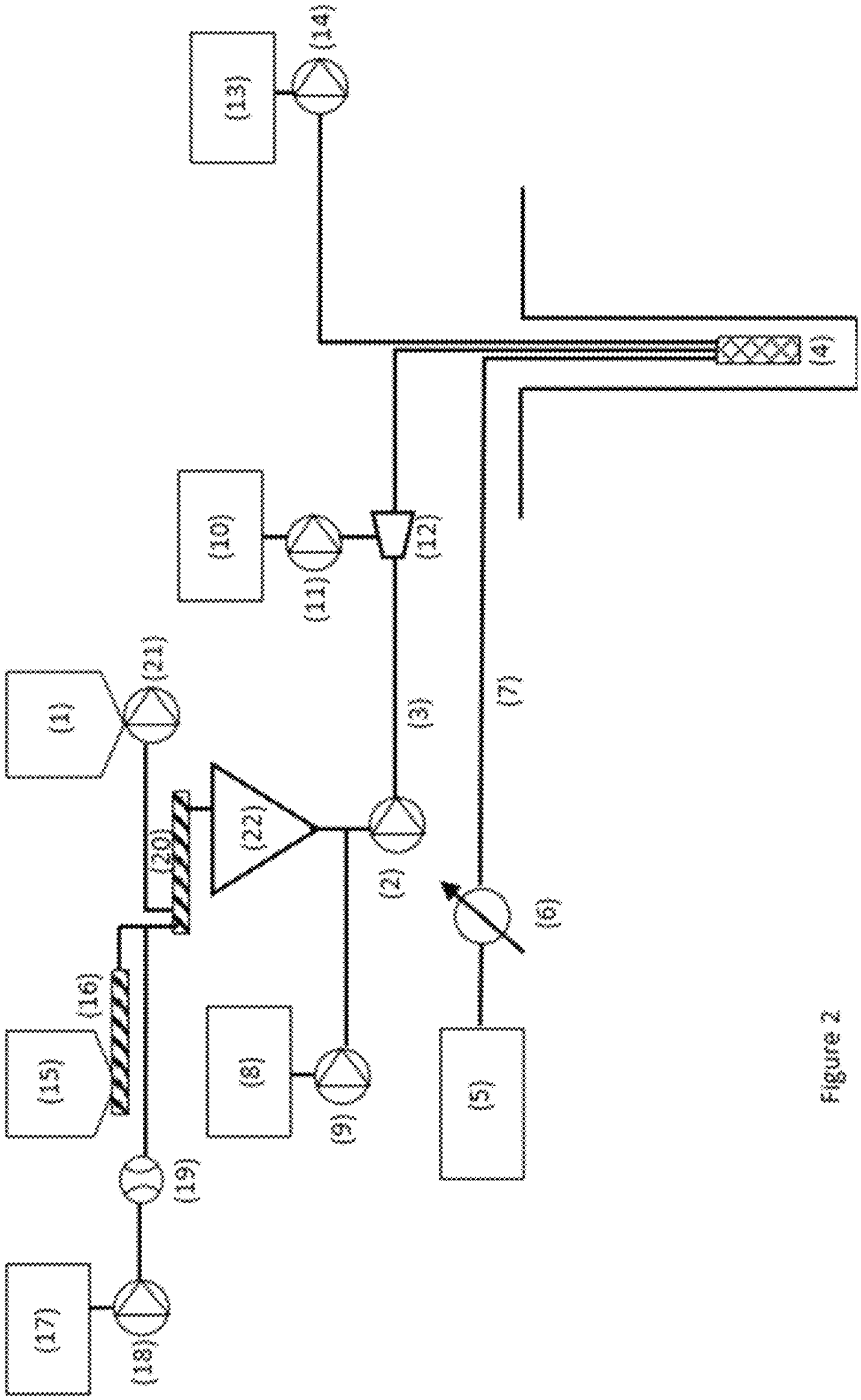
FIG. 2 shows a schematic drawing of another embodiment of an installation for loading boreholes with bulk watergel explosive according to this invention.

FIG. 2 shows an alternative embodiment of the installation provided by this invention that complements the above installation, to load boreholes with pumpable blends of matrix and ANFO (or granulated oxidizer and a fuel). This installation comprises, besides the elements previously mentioned:

- a tank (15) for storing granular ammonium nitrate,
- a dosing system (16) for ammonium nitrate,
- a tank (17) to storage liquid fuel,
- a pump (18) and flow meter (19) for liquid fuel, a mixing auger (20) to blend ammonium nitrate and liquid fuel and the matrix suspension, a matrix pump (21) connecting the matrix tank (1) with the mixing auger (20), and a hopper (22) connected to the delivery pump (2).

In an alternative embodiment, no liquid fuel is added and therefore the tank (17) and the dosing system (18, 19) are not necessary.

In a particular and preferred embodiment, the installation is located on a mobile unit for loading the holes or a pumping truck.

EXAMPLES

The invention is illustrated by means of the following examples which in no case limit the scope of the invention.

Example 1

An installation for loading boreholes was assembled on an underground vehicle. The installation comprised the following elements according to FIG. 1:

A 1,200 l tank (1) to storage a matrix suspension, a progressive cavity (PC) pump (2) connected to the matrix suspension tank (1), a 1" flexible delivery hose, 20 m long, connected to the PC pump (2), an inline helicoidal type static mixer (4) connected at the end of the delivery hose. This static mixer is composed of different mixing elements. The number of elements can be changed to accommodate to the different pumping rates to minimize back pressure and optimize the degree of mixing, an air reservoir (5) composed by a small compressor connected to a gas constant flow regulator (6) with flowmeter, installed to compensate changes in back pressure, a ⅛" pneumatic flexible tube (7) inserted inside the delivery hose by a through-wall connector. This tube connects the air flow regulator (6) with the static mixer (4), a 50 l tank (8), to storage a gas stabilizer solution, connected to the inlet of a metering pump (9). The pump (9) outlet was connected to the inlet of the delivery pump (2), a 50 l tank (13), to storage a crosslinker solution, connected to the inlet of a metering pump (14). The pump outlet was connected to the static mixer (4) through a ⅛" flexible tube. This tube was inserted inside the delivery hose by a through-wall connector, a 75 l water tank (10) connected to the inlet of a piston pump (11). The pump outlet was connected to a lubrication ring (12), located in the delivery hose (3).

The tank (1) was filled with the non-explosive matrix suspension, described in table 1.

TABLE 1

| Component | % |
|---|---|
| Water | 13.1 |
| Methyl amine nitrate | 14.7 |
| Ammonium nitrate | 68.9 |
| Guar gum | 0.8 |
| Diesel fuel | 2.5 |

Matrix Suspension Composition

The density of the matrix was 1.47 g/cm$^3$.

The tank (8) was filled with a solution of MYCE (MAXAM's proprietary solution of gas stabilizer). Tank (13) was filled with crosslinker solution consisting in a solution of potassium pyroantimonate at a concentration of 1%. Tank (10) was filled with water for lubrication.

A 12-element inline helicoidal 1" static mixer was placed at the end of the delivery hose.

Once all the tanks were filled, the process of loading and sensitizing was started. In the following table are shown the loading process parameters (flow rates of matrix, air, gas stabilizer solution, crosslinker solution and water for lubrication), pumping pressures and density of the product at the exit of the loading hose:

TABLE 2

| Matrix (kg/min) | Air (l/min) NTP | Stabilizer solution l/min | Crosslinker solution l/min | Water l/min | Pumping Pressure kg/cm$^2$ | Density g/cm$^3$ |
|---|---|---|---|---|---|---|
| 25 | 9.5 | 0.19 | 0.28 | 0.36 | 4.1 | 0.96 |
| 30 | 9.5 | 0.15 | 0.31 | 0.44 | 4.8 | 1.01 |
| 45 | 9.5 | 0.21 | 0.41 | 0.65 | 6.2 | 1.13 |
| 60 | 9.5 | 0.31 | 0.59 | 0.88 | 8.6 | 1.21 |
| 60 | 20.5 | 0.31 | 0.59 | 0.88 | 8.9 | 1.01 |
| 45 | 20.5 | 0.21 | 0.41 | 0.65 | 6.7 | 0.91 |
| 30 | 20.5 | 0.15 | 0.31 | 0.44 | 5.2 | 0.75 |
| 25 | 20.5 | 0.19 | 0.28 | 0.36 | 4.9 | 0.68 |
| 25 | 30.1 | 0.25 | 0.28 | 0.36 | 5.5 | 0.55 |
| 25 | 40.0 | 0.25 | 0.28 | 0.36 | 5-7 | 0.72 |

As it can be seen in the table, it was possible to get a range of densities between 0.55 and 1.21 by varying the ratios of the flow rates of matrix and air, what allows to choose high density for the cut area and low density for the contour of the blast to get full advance and minimum damage of the walls.

In the last test, the final density achieved was higher than in the previous one, even injecting higher volume of air. The pressure was pulsating with fluctuations between 5 and 7 kg/cm$^2$. It means that with the present number of elements in the static mixer, there is no enough mixing capacity to incorporate all the air injected. In this case, injecting higher volume of air the capacity to incorporate it into the matrix is reduced since the excess of air reduces the mixer capacity to disperse the air.

Results of new series of tests done with 6 more helicoidal mixing elements are shown in next table.

TABLE 3

| Matrix (kg/min) | Air (l/min) NTP | Stabilizer l/min | Crosslinker l/min | Water l/min | Pumping Pressure kg/cm$^2$ | Density g/cm$^3$ |
|---|---|---|---|---|---|---|
| 25 | 40.0 | 0.25 | 0.28 | 0.36 | 6.9 | 0.45 |
| 30 | 40.0 | 0.15 | 0.31 | 0.44 | 7.6 | 0.51 |
| 45 | 40.0 | 0.21 | 0.41 | 0.65 | 8.9 | 0.66 |
| 60 | 40.0 | 0.31 | 0.59 | 0.88 | 10.2 | 0.76 |

As it can be seen in the table, the capacity to incorporate the injected air improves, getting lower values of explosive density, as the number of mixing elements was increased.

Example 2

An installation for loading boreholes was assembled on an open pit vehicle. The installation comprised the following elements according to FIG. 2:

A 7,500 l tank (1) to storage a matrix suspension,
a lobe pump (21) connected to the matrix suspension tank,
a 5,000 l tank (15) to storage granular ammonium nitrate,
an auger (16) located in the bottom of the tank (15) to dose ammonium nitrate,
a 500 l tank (17) to storage diesel, connected to a metering pump (18) and a flow meter (19),
a mixing auger (20) to blend ammonium nitrate, diesel oil and matrix suspension,
a 150 l hopper (22) to collect the blend from the mixing auger (20)
a progressive cavity (PC) pump (2) connected to the hopper (22),
a 2" delivery hose, 35 m long connected to the PC pump (2),
an inline helicoidal 2" static mixer (4) connected at the end of the delivery hose,
an air reservoir (5) which is connected to the compressor of the truck and to a gas constant flow regulator (6) with flowmeter,
a 3/16" pneumatic flexible tube (7) inserted inside the delivery hose by a through-wall connector. This tube connects the air flow regulator (6) with the static mixer (4),
a 200 l tank (8) for gas stabilizer solution and a metering pump (9) for stabilizer solution. The pump (9) connects the stabilizer tank to the suction of the delivery pump (2),
a 200 l tank (13) for a crosslinker solution and a metering pump (14) connecting the tank (13) with the static mixer (4) through a 1/8" flexible tube, that is inserted inside the delivery hose by a through-wall connector,
a 500 l water tank (10) with a piston pump (11) connected to a lubrication ring (12), located in the delivery hose (3).

The tank (1) was filled with the formulation of the non-explosive matrix suspension described in table 4. The density of the matrix was 1.45 g/cm$^3$.

TABLE 4

| Component | % |
|---|---|
| Water | 14.0 |
| Hexamine nitrate | 14.0 |
| Ammonium nitrate | 71.4 |
| Guar gum | 0.6 |

Matrix Suspension Composition

The tank (15) was filled with granular ammonium nitrate, the tank (17) was filled with diesel oil, the tank (8) was filled with a solution of MYCE (MAXAM's proprietary solution of gas stabilizer). Tank (13) was filled with crosslinker solution consisting in a solution of potassium pyroantimonate at a concentration of 1%. Tank (10) was filled with water for lubrication.

A 9-element helicoidal 2" static mixer was inserted at the end of the delivery hose.

Once all the tanks were filled, the process of loading and sensitizing was started. The matrix was pumped into the mixing auger (20) where it was blended with ammonium nitrate and diesel oil. The resulting blend was sent to the hopper (22) and pumped into the borehole while was sensitized with air at the end of the hose.

In the following table are shown the loading process parameters (flow rates of matrix, ammonium nitrate, diesel oil, air, gas stabilizer solution, crosslinker solution and water for lubrication), pumping pressures and density of the product at the exit of the loading hose:

TABLE 5

| Matrix (kg/min) | Ammonium nitrate (kg/min) | Diesel oil (l/min) | Delivery pump (kg/min) | Air (l/min) NTP | Stabilizer l/min | Crosslinker l/min | Water l/min | Pumping Pressure kg/cm$^2$ | Density g/cm$^3$ |
|---|---|---|---|---|---|---|---|---|---|
| 150 | 0 | 0 | 150 | 31.5 | 0.9 | 1.3 | 2.4 | 3.7 | 1.13 |
| 150 | 0 | 0 | 150 | 40.0 | 0.9 | 1.3 | 2.4 | 4.1 | 1.05 |
| 150 | 35 | 2.6 | 185 | 40.0 | 1.1 | 1.6 | 3.1 | 5.8 | 1.09 |
| 150 | 35 | 2.6 | 185 | 54.0 | 1.1 | 1.6 | 3.1 | 6.6 | 1.01 |
| 150 | 60 | 4.5 | 210 | 54.0 | 1.4 | 2.0 | 3.4 | 8.9 | 1.05 |
| 150 | 60 | 4.5 | 210 | 75.0 | 1.4 | 2.0 | 3.4 | 9.4 | 0.95 |

As it can be seen in the table, it is possible to control the density of blends of matrix suspension with ammonium nitrate and fuel oil (ANFO) while pumping into the blast hole by adjusting the flow rates of the blend and air, mixing at the end of the hose.

The invention claimed is:

1. A procedure for loading a borehole with a bulk water-based suspension or watergel-type explosive comprising: (i) transportation of a water-based matrix suspension to the location for loading, said matrix suspension comprising at least an oxidant salt, a fuel, and a thickener, and (ii) sensitization of the matrix suspension to be explosive during the delivery into the borehole, wherein said procedure comprises:

a) dosing the matrix suspension into the borehole through a delivery hose,
b) injecting a gas into the matrix suspension at the end of the delivery hose,
c) dispersing the gas in the matrix suspension using a mixer located at the end of the delivery hose, and
d) fixing an explosive density by regulating the flow rates of matrix suspension and gas.

2. The procedure according to claim 1 further comprising the addition of a gas bubble stabilizer to the matrix suspension upstream of the mixer at the end of the delivery hose.

3. The procedure according to claim 1 further comprising the addition of a crosslinker to the matrix suspension upstream of the mixer at the end of the delivery hose.

4. The procedure according to claim 1 further comprising mixing of the matrix suspension with ammonium nitrate and fuel oil (ANFO) or granular ammonium nitrate and optionally fuel before dosing into the borehole, being the percentage of matrix higher than 50% in the final mixture.

5. The procedure according to claim 2 further comprising the addition of a crosslinker to the matrix suspension upstream of the mixer at the end of the delivery hose.

6. The procedure according to claim 2 further comprising mixing of the matrix suspension with ANFO or granular ammonium nitrate and optionally fuel before dosing into the borehole, being the percentage of matrix higher than 50% in the final mixture.

7. The procedure according to claim 3 further comprising mixing of the matrix suspension with ANFO or granular ammonium nitrate and optionally fuel before dosing into the borehole, being the percentage of matrix higher than 50% in the final mixture.

* * * * *